United States Patent [19]
Kodachi

[11] Patent Number: 5,216,928
[45] Date of Patent: Jun. 8, 1993

[54] RACK AND PINION TYPE STEERING APPARATUS

[75] Inventor: Yoshinori Kodachi, Kashiwara, Japan

[73] Assignee: Koyo Seiko Co., Ltd., Osaka, Japan

[21] Appl. No.: 855,527

[22] Filed: Mar. 23, 1992

[30] Foreign Application Priority Data

Apr. 2, 1991 [JP] Japan .............. 3-029912[U]

[51] Int. Cl.⁵ ............................................. F16H 1/04
[52] U.S. Cl. ...................................... 74/422; 74/498; 384/296
[58] Field of Search .................. 74/498, 422; 384/903, 384/296, 295

[56] References Cited

U.S. PATENT DOCUMENTS 4,213,660  7/1980  Yani et al. .................. 384/903 X
4,509,870  4/1985  Taki ............................. 384/296

FOREIGN PATENT DOCUMENTS 59-192670 11/1984 Japan .
61-13019   1/1986  Japan .
55-170890  5/1989  Japan .

Primary Examiner—Dirk Wright
Attorney, Agent, or Firm—James D. Hall

[57] ABSTRACT

A rack and pinion type steering apparatus with a bushing sleeve which increases the rigidity of the joint mechanism thereof, by enhancing the rigidity of the bushing sleeve by alternately forming an area in contact with the inner surface of a steering gear housing and an area not in contact with the inner surface of the housing on the outer surface thereof in the circumferential direction, with a column member provided at a part of the noncontacting area so as to touch the inner surface of the housing, so as to support the pressure impressed in the radial direction to a steering gear rack thereby to prevent the vibration of the steering gear rack.

7 Claims, 9 Drawing Sheets

RACK AND PINION TYPE STEERING APPARATUS

BACKGROUND OF THE INVENTION

1. Field of the Invention

This invention relates to an improvement of a rack and pinion type steering apparatus of a motor vehicle such as an automobile with a bushing sleeve for slidably supporting a steering gear rack within a steering gear housing.

2. Description of the Related Art

In a rack and pinion type power steering apparatus of an automobile, when a pinion shaft coupled to a steering wheel rotates accompanying with the rotation of the steering wheel, a steering gear rack engaged with the pinion shaft is shifted right and left within a steering gear housing, thereby to steer wheels. Various kinds of proposals have been made for a bushing sleeve to slidably support the steering gear rack in the steering gear housing of the rack and pinion type power steering apparatus as above-described (Japanese Utility Model Laid-Open No. 54-69532, Japanese Patent Laid-Open No. 61-13019).

FIG. 1 is a cross section of a conventional bushing sleeve in using, and FIG. 2 is an enlarged cross section taken along the line II—II of FIG. 1. In the drawings, numerals respectively represent: 21 a steering gear housing; 22 a steering gear rack; 23 a pinion shaft; and 24 and 25 busing sleeves.

The steering gear rack 22 is slidably supported at two points by respective bushing sleeves 24, 25 within the steering gear housing 21 which are away from the pinion shaft 23 and in the vicinity of the pinion shaft 23.

The busing sleeves 24, 25 are formed circular of synthetic resin. Regarding one bushing sleeve 24, as indicated in FIG. 2, it has circular arc contacting areas 24a in contact with the inner surface of the steering gear housing 21, and noncontacting areas 24b which are so flat as to be cut off on the outer surface, where the contacting area 24a and noncontacting area 24b are alternately arranged. A catching projection 24c is formed approximately at the center of each contacting area 24a. The bushing sleeve 24 in the structure as above is inserted between the housing 21 and steering gear rack 22, so that each catching projection 24c is fitted into a corresponding hollow 21a of the housing 21.

In the meantime, since a space 26 is formed in the conventional bushing sleeve 24 between the noncontacting area 24b of the bushing sleeve 24 and the inner surface of the housing 21, so as to absorb the dimensional errors and to secure the circulation of air, the noncontacting area 24b is rendered to be thin and accordingly low in rigidity, the steering gear rack 22 may be deflected at a part corresponding to the space 26 when a radial force acts to the rack 22, with generating a hitting noise. Moreover, the rigidity of the joint of the steering gear rack 22 and pinion shaft 23 is low in the conventional structure.

SUMMARY OF THE INVENTION

Accordingly, this invention has been devised to solve the aforementioned problems and has for its object to provide a rack and pinion type steering apparatus with bushing sleeve having increased rigidity, whereby the rigidity of a joint of a steering gear rack and pinion shaft is prevented from being deteriorated even by the application of the radial force to the steering gear rack.

The above and further objects and features of the invention will more fully be apparent from the following detailed description with accompanying drawings.

DESCRIPTION OF THE PREFERRED EMBODIMENTS

Figure 1:
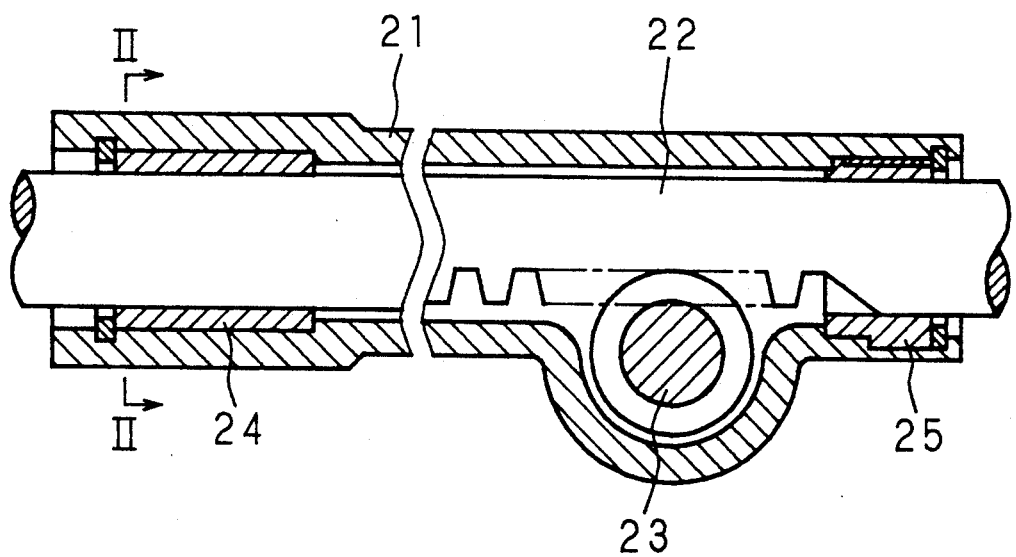
FIG. 1 is a cross section of a conventional bushing sleeve in using.
Figure 2:
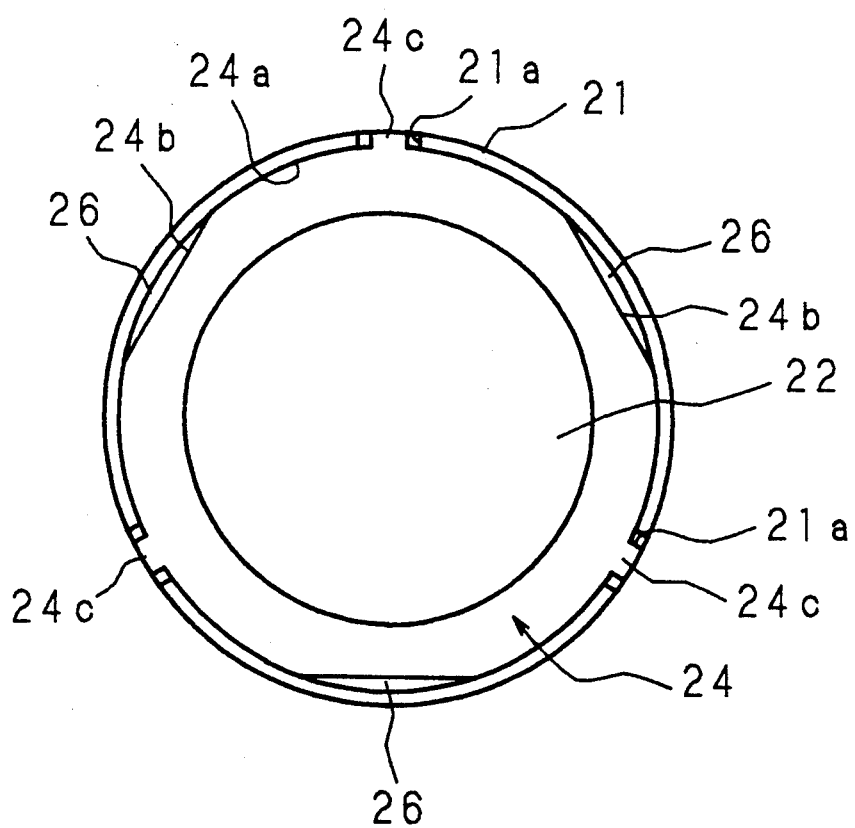
FIG. 2 is an enlarged cross section taken along the line II—II of FIG. 1.
Figure 3:
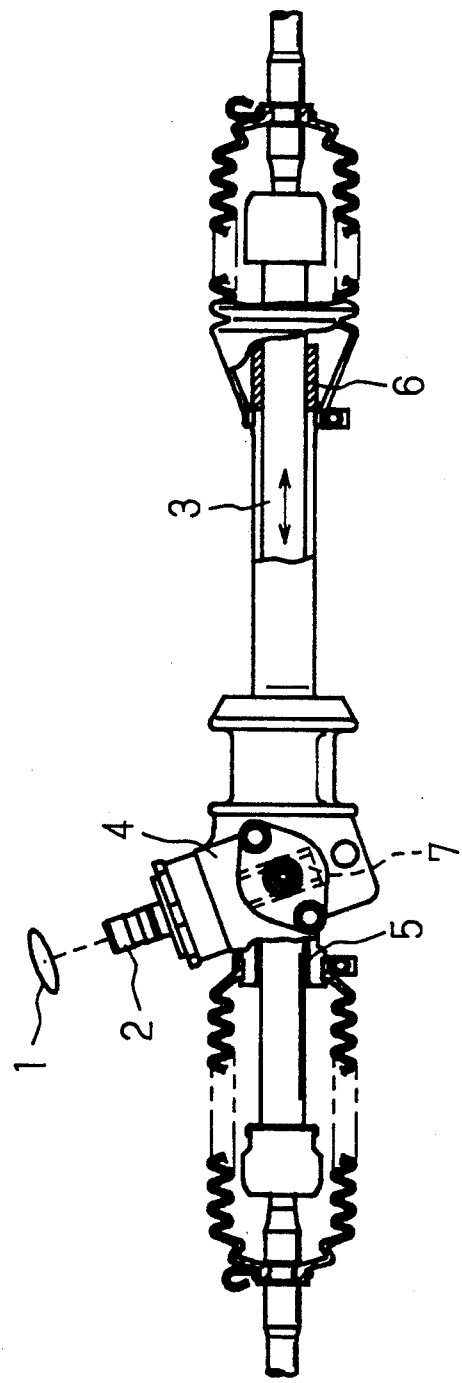
FIG. 3 is a front elevation, partly broken, of a bushing sleeve in using according to this invention.

This invention will now be depicted in detail with reference to the accompanying drawings of one preferred embodiment thereof. FIG. 3 is a front elevational view, partly broken, of a rack and pinion power steering apparatus with a bushing sleeve according to the invention and FIG. 4 is a partial enlarged view of FIG. 3, wherein numerals respectively represent: 1 a steering wheel; 2 a shaft connected to a pinion shaft 7; 3 a steering gear rack; 4 a steering gear housing: and 5, 6 bushing sleeves.

The pinion shaft 7 interlocking with the steering wheel 1 is engaged with the steering gear rack 3 in the steering gear housing 4. At the same time, the pinion shaft 7 is rotatably held by a bearing, and the steering gear rack 3 is supported by the bushing sleeves 5, 5 slidabley in the axial direction.

Figure 4:
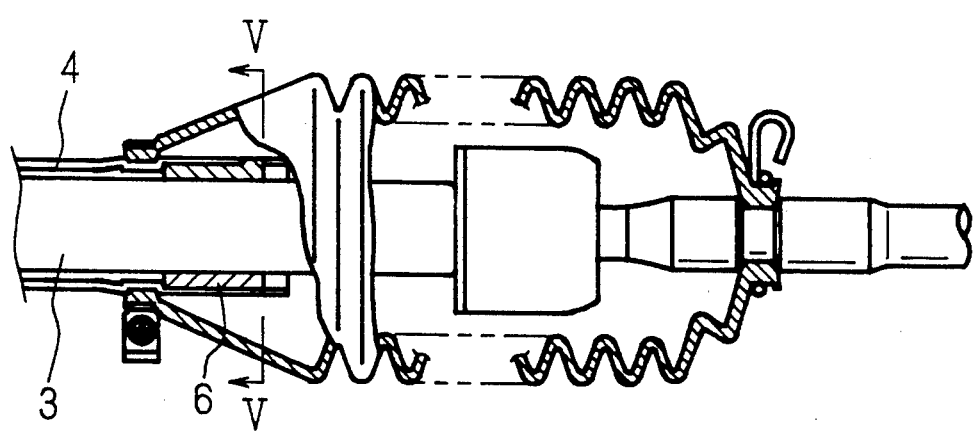
FIG. 4 is a partial enlarged view of FIG. 3.
Figure 5:
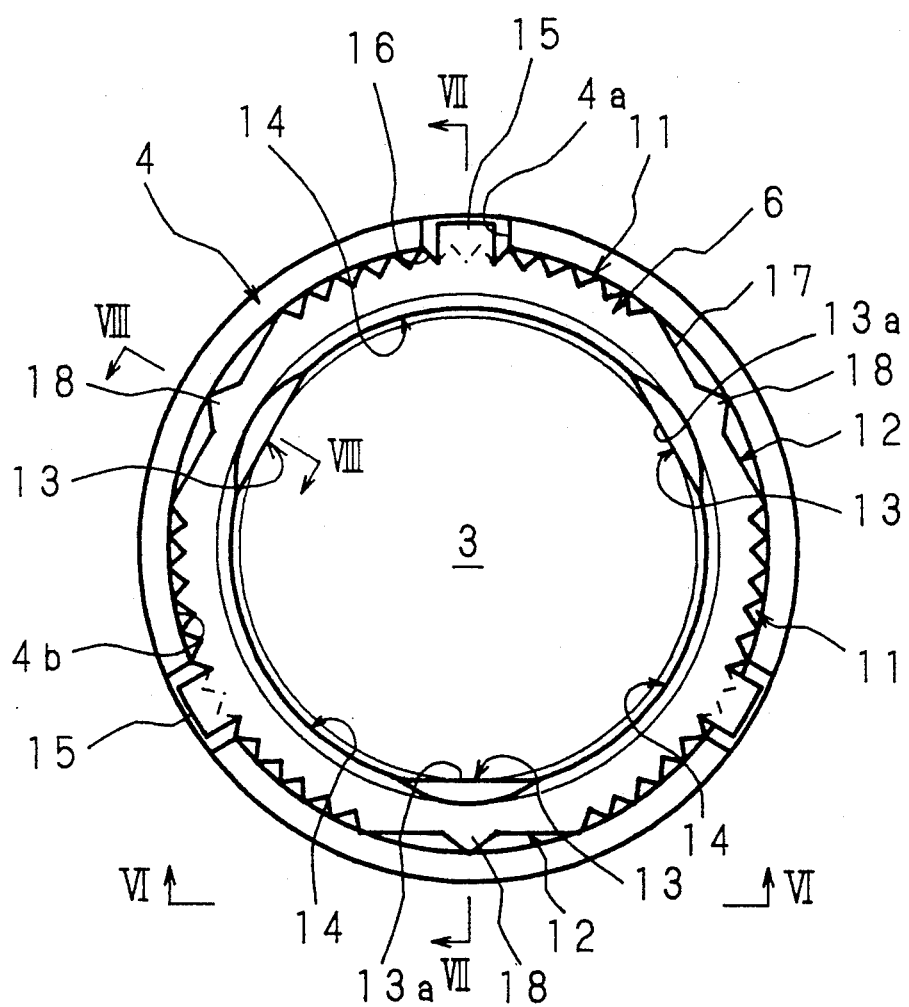
FIG. 5 is an enlarged cross section taken along the line V—V of FIG. 4.
Figure 6:
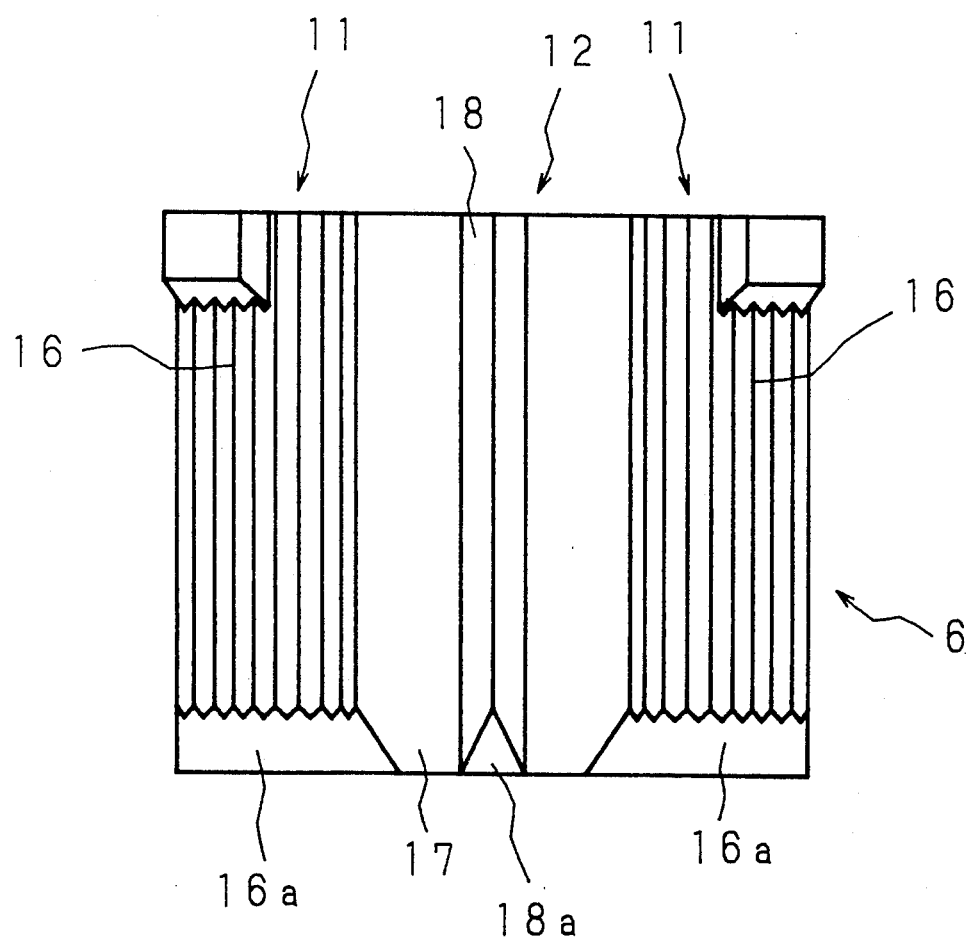
FIG. 6 is a side section taken along the line VI—VI of FIG. 5.
Figure 7:
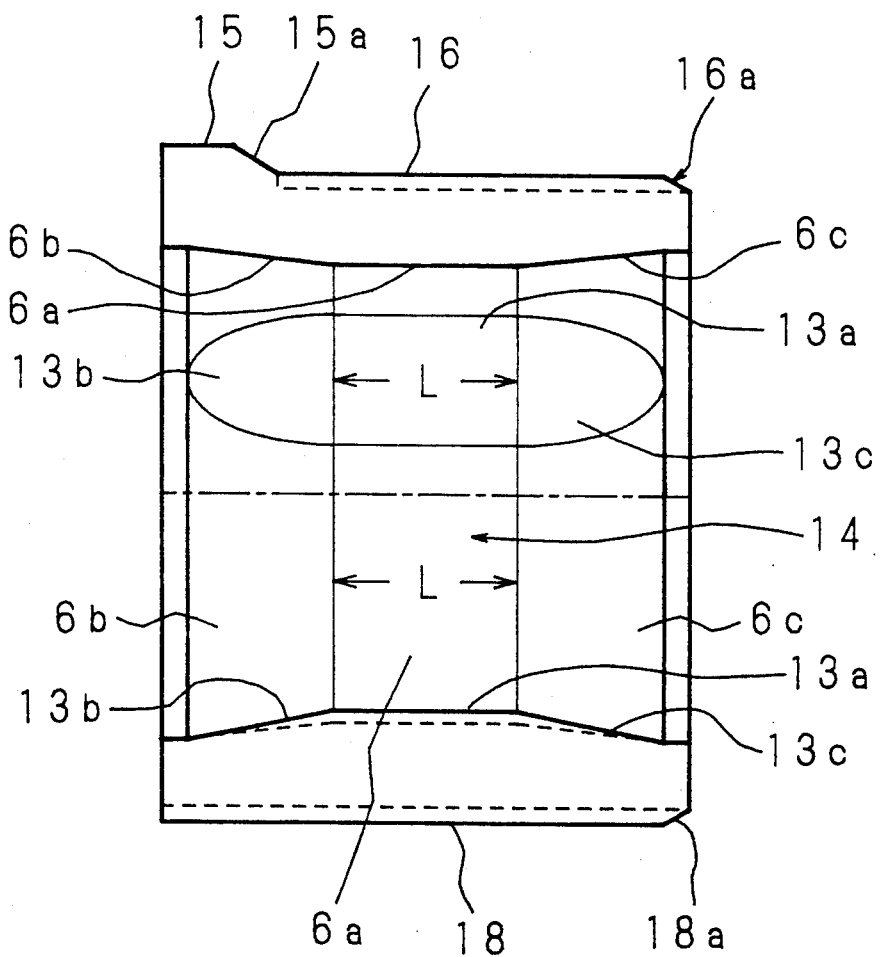
FIG. 7 is a cross section taken along the line VII—VII of FIG. 5.
Figure 8:
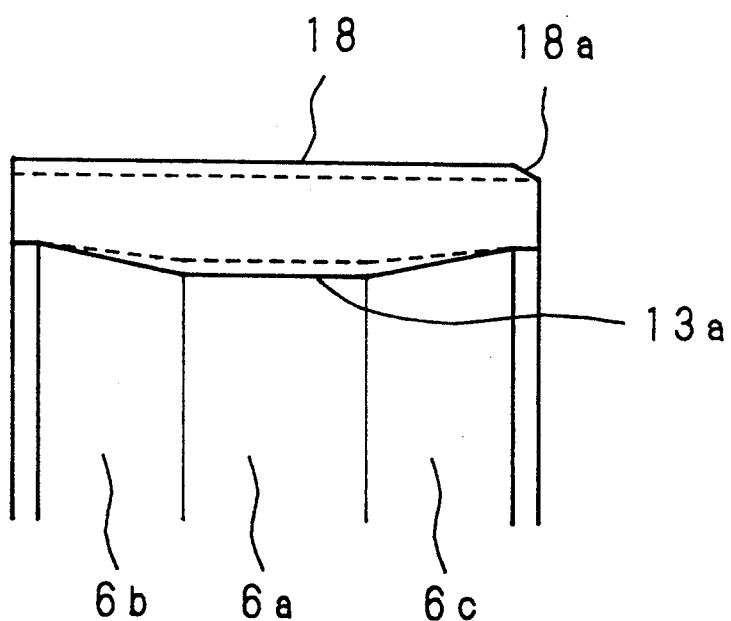
FIG. 8 is a cross section taken along the line VIII—VIII of FIG. 5.

FIG. 5 is an enlarged cross sectional view taken along the line V—V of FIG. 4, FIG. 6 is a side sectional view taken along the line VI—VI of FIG. 5, FIG. 7 is a cross sectional view taken along the line VII—VII of FIG. 5, and FIG. 8 is a cross sectional view taken along the line VIII—VIII of FIG. 5.

The circular bushing sleeve 6 is made of synthetic resin such as oleoreginous polyacetal. There are contacting areas 11 and noncontacting areas 12 of the same number where the contacting area 11 and noncontacting area 12 are alternately formed in the circumferential direction of the outer surface of the bushing sleeve 6. The contacting area 11 widely touches the inner surface of the housing 4. On the other hand, the noncontacting area 12 has an air vent gap spaced from the inner surface of the steering gear housing 4, and therefore touches the inner surface of the housing 4 only in a narrow and small section. As shown in FIG. 7, a slidably contacting face 6a is formed at the central part in the axial direction of the inner surface of the bushing sleeve 6, with the width L and the inner diameter approximately equal to the diameter of the steering gear rack 3. Moreover, tapered faces 6b, 6c are provided at both ends of the slidably contacting face 6a. The inner diameter of each tapered face becomes slightly larger than the diameter of the steering gear rack 3 towards the terminal end of the face. In the circumferential direction of the inner surface of the bushing sleeve 6, an area 13 corresponding to the noncontacting area 12 slidably contacting the outer surface of the steering gear rack 3 with interference over the width L at the center of the axial direction of the busing sleeve as indicated in FIG. 5, and an area 14 formed alternately with the area 13 and corresponding to the contacting area 11 slidably contacting the outer surface of the steering gear rack 3 without interference over the width L at the center of the axial direction of the bushing sleeve.

A projection 15 for positioning and fixing the bushing sleeve to the steering gear housing 4 is formed at one end in the axial direction and in the cirumferential center of the contacting area 11. A serration 16 to fit the inner surface 4b of the steering gear housing 4 is formed in the contacting area 11 except where the projection 15 is formed. Accordingly, the bushing sleeve 6 fit the inner surface of the housing 4 by the serration 16 with interference, and elasticity of the bushing sleeve 6 prevents the inner diameter of the bushing sleeve from being distorted.

An end face of the projection 15 at the other end side of the bushing sleeve 6 is, as is clear from FIG. 7, such a tapered face 15a which is lower towards the end as to facilitate insertion of the bushing sleeve 6 into the steering gear housing 4. Similarly, at the other end of the serration 16 is formed a tapered face 16a which is lower towards the end as illustrated in FIGS. 6, 7, thereby forming a step difference 16a.

A flat face 17 cut off in the axial direction thereof is formed in the noncontacting area 12, and a column 18 having a triangular cross section is formed from one end to the vicinity of the other end in the axial direction and at the central part in the widthwise direction of the noncontacting area 12. When the bushing sleeve 6 is mounted between the steering gear housing 4 and steering gear rack 3, the column 18 is pressed to the inner surface of the housing 4, so that the air vent gap is defined at either side of the column 18. The gap is effective to generate interference between the area 13 of the bushing sleeve 6 and the steering gear rack 3 thereby to absorb the outward distortion of the bushing sleeve 6.

Figure 9A:
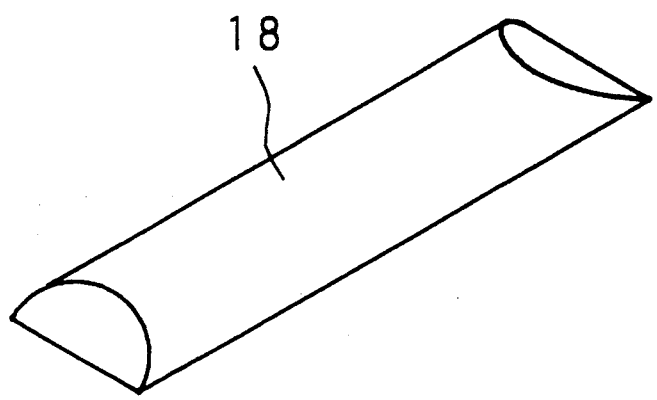
FIGS. 9A and 9B are perspective views of the columns of other embdiments.
Figure 9B:
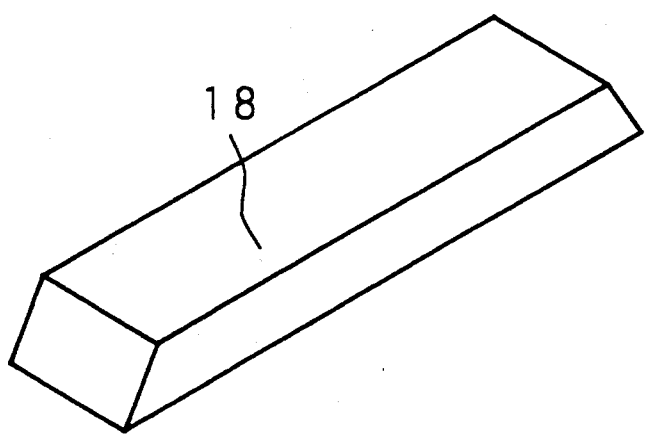

As shown in FIGS. 6 through 8, an end face of the column 18 at the other end of the bushing sleeve 6 is rendered a tapered face 18a which is lower towards the other end of the bushing sleeve 6. The column 18 is not limited to a triangular prism, but a square pillar, a semicircular cylinder, etc. may be possible as shown in FIG. 9.

With reference to FIGS. 5, 7, the area 13 has a flat face 13a parallel to the flat face 17 of the area 12 over the width L in the axial direction of the steering gear rack 3 thereby to slidably contacts with the outer surface of the steering gear rack 3 with interference over the width L. At the both ends of the area 13, tapered faces 13b, 13c are respectively formed, which are lower towards the end. The area 14 contacts with the outer surface of the steering gear rack 3 in the slidably contacting face 6a over the width L at the central part in the axial direction of the bushing sleeve 6. Since the bushing sleeve 6 slidably contacts the steering gear rack 3 at the three flat faces 13a of the areas 13 with interference, even when the slidably contacting portions wear, the clearance between the flat faces 13a and the steering gear rack 3 does not appear thereby to prevent from generating the hitting sound of the steering gear rack 3.

When the bushing sleeve of this invention is to be mounted, the bushing sleeve is inserted from an end part of the steering gear housing 4 so as to fit the serration 16 to the inner surface 4b of the housing 4. When the projection is fitted into a hollow 4a of the housing 4, the bushing sleeve 6 is prevented from turning and moving in the steering gear housing 4, whereby the bushing sleeve 6 is fixed to the housing 4. In this state, each column is pressed against the inner peripheral surface of the steering gear housing 4 at the central part of the area 12, thereby enhancing the rigidity of the area 12, and bearing the radial force impressed to the steering gear rack 3 to eliminate the vibration of the rack 3. At the same time, the rigidity of the joint of the steering gear rack and pinion shaft is also increased.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A rack and pinion type steering apparatus which has a pinion connected to a steering wheel, a rack shaft with a toothed rack engaged with said pinion, and a bushing sleeve mounted between said rack shaft and a steering gear housing for supporting said rack shaft, said bushing sleeve comprising:

contacting areas in contact with the inner surface of said housing and noncontacting areas not in contact with the inner surface of said housing, wherein the contacting areas and noncontacting areas are alternately formed in the circumferential direction of the outer surface of the rack, and a columnular portion formed on the surface of said non-contacting area and extending along the axial length thereof, said columnular portion being of such a thickness as to extend to and abut (so as to touch) the inner surface of said housing, thereby to prevent distortion of said bushing sleeve.

2. A rack and pinion type steering apparatus according to claim 1, wherein a serration is formed on the outer surface of said contacting area so as to tightly fit into said housing.

3. A rack and pinion type steering apparatus according to claim 1, wherein said bushing sleeve further comprises:

an area to slidably but tightly fit the steering gear rack, formed on the inner surface of said bushing sleeve at a point corresponding to said noncontacting area and in the center of the axial direction of the steering gear rack.

4. A rack and pinion type steering apparatus according to claim 1, wherein said columnular member is in the shape of a triangular prism.

5. A rack and pinion type steering apparatus according to claim 1, wherein said columnular member is in the shape of a polygonal pillar.

6. A rack and pinion type steering apparatus according to claim 1, wherein said columnular member is in the shape of a semicircular cylinder.

7. A rack and pinion type steering apparatus which has a pinion connected to a steering wheel, a rack shaft with a toothed rack engaged with said pinion, and a bushing sleeve mounted between said rack shaft and a steering gear housing for supporting said rack shaft, said bushing sleeve comprising:

contacting areas in contact with the inner surface of said housing and non-contacting areas not in contact with the inner surface of said housing, wherein the contacting areas and non-contacting areas are alternately formed in the circumferential direction of the outer surface of the rack, and strengthening means formed on the inner face of said bushing sleeve and on the outer face of said bushing sleeve, said strengthening means positioned at the mid-point of said non-contacting areas, said strengthening means on the outer face of said bushing sleeve extending outwardly a distance so to bear against the inner surface of said housing, and said strengthening means on the inner face of said bushing sleeve extending inwardly to contact the outer surface of said steering gear rack shaft, thereby to prevent distortion of said bushing sleeve.

* * * * *